United States Patent [19]

Capriotti et al.

[11] 4,085,513
[45] Apr. 25, 1978

[54] CONTINUOUS CASTER-ALIGNMENT APPARATUS

[75] Inventors: Alfred J. Capriotti, Falls Township, Bucks County; Louis G. Lazzaretti, Harmony Township, Beaver County, both of Pa.

[73] Assignee: United States Steel Corporation, Pittsburgh, Pa.

[21] Appl. No.: 663,390

[22] Filed: Mar. 3, 1976

Related U.S. Application Data

[62] Division of Ser. No. 596,035, Jul. 14, 1975, Pat. No. 3,967,362.

[51] Int. Cl.² .................... B22D 11/12; G01C 15/00
[52] U.S. Cl. ........................... 33/286; 33/182; 29/464; 164/442
[58] Field of Search ............... 33/181 R, 182, 286; 29/200 P, 407, 467, 464, 468, 469; 164/282; 193/35 R, 35 C; 248/2, 19

[56] References Cited

U.S. PATENT DOCUMENTS

| | | | |
|---|---|---|---|
| 3,167,829 | 2/1965 | Hess et al. | 164/282 |
| 3,672,438 | 6/1972 | Hoffman et al. | 164/282 |
| 3,718,177 | 2/1973 | Wagner, Jr. | 164/282 |
| 3,757,405 | 9/1973 | Kurth et al. | 164/282 |
| 3,854,188 | 12/1974 | Anderton et al. | 29/469 |
| 3,863,356 | 2/1975 | Bengel et al. | 33/286 |

*Primary Examiner*—Richard E. Aegerter
*Assistant Examiner*—Richard R. Stearns
*Attorney, Agent, or Firm*—William A. Danchuk

[57] ABSTRACT

An apparatus employed in the alignment of various components of a continuous-casting machine. The apparatus may be used relative to the continuous-casting machine per se, or it may be employed at a location removed from the continuous-casting machine. The apparatus insures a more accurate alignment of the components with a substantial minimization of downtime during such alignment.

6 Claims, 5 Drawing Figures

CONTINUOUS CASTER-ALIGNMENT APPARATUS

This is a division, of application Ser. No. 596,035, filed July 14, 1975, now U.S. Pat. No. 3,967,362.

BACKGROUND OF THE INVENTION

The continuous-casting method of producing steel product, as well as the basic machinery necessary for the employment of such method, have been well known in the steel industry for some time. This is not to suggest that continuous-casting machines are simple in either their substance or operation. In fact, continuous casters are multi-element machines which must be precisely "tuned" for their proper operation.

In order to provide for both efficient operation of the caster and good product formation, it is necessary to align the components of the continuous caster to within relatively strict limits. The alignment methods which have been employed in the past have, in part, employed the use of plumb-bobs and straight edges from points proximate the mold to the curved rack portion of the caster. It should be obvious that the employment of such methods and measuring apparatus are both cumbersome and dangerous as well as time consuming. The amount of downtime for the casting equipment during its alignment within the continuous-casting machine itself is far in excess of what it optimally should be. This is especially important when considered in light of both labor as well as equipment costs.

The casting requirements dictated by the number of tons of steel which must be cast, as well as the expense of downtime, necessitate the quick alignment of the elements of the continuous caster. Moreover, it would certainly be desirable as well as efficient to provide for the alignment of the elements of a continuous-casting machine both within their operative positions in the machine as well as their prealignment outside of the casting machine such that a quick substitution of specific elements may be made for those elements within the caster which have broken down or become misaligned. Additionally, there is the need for a more efficient and accurate apparatus for achieving alignment of the elements both within and without the continuous-caster machine itself.

SUMMARY OF THE INVENTION

The present invention is addressed to an apparatus employed in the aligning of various components of a continuous-casting machine. The method of alignment may be practiced either within the continuous-casting machine itself or removed from the continuous-casting machine.

The method, in its most fundamental form, utilizes a vertical sighting optical instrument to sight through a series of targets placed in predetermined relationship with each of the components of the continuous-casting machine. The individual components of the machine are then adjusted to positions in which each target associated with each component of the caster is in alignment with each of the other targets. As a result, all of the components of the casting machine are aligned to a given line of sight which is in a predetermined relationship with the center pass line of the product through the casting machine. While the method may be practiced both within the casting machine itself, as well as without the casting machine, the latter operation requires a test and alignment apparatus for both supporting the components of the caster which are to be aligned, as well as providing means and mechanisms for adjusting one component of the continuous caster and its target relative to the other components and targets of the continuous-casting machine. The test and alignment stand in addition, provides a convenient storage for the elements of the continuous caster prior to their substitution into the machine per se, thereby providing a quick substitution of aligned caster elements with those already in the caster but which must be removed for some reason.

It is therefore a primary object and feature of the present invention to provide an apparatus for aligning various components of a continuous-casting machine employing, in part, an optical sighting instrument.

It is a general object and feature of the present invention to provide an apparatus to be employed in the alignment of various components of a continuous-casting machine at a location removed from the continuous-casting machine per se, thereby providing for the substitution of the aligned components of the continuous-casting machine for similar components within the machine which, for some reason, must be removed.

It is another object and feature of the present invention to provide an apparatus to be employed for the alignment of various components of a continuous-casting machine in such a manner as to minimize the downtime required for adjustments of the components and their substitution into the continuous-casting machine per se.

Other objects and features of the invention will, in part, be obvious and will, in part, become apparent as the following description proceeds. The features of novelty which characterize the invention will be pointed out with particularity in the claims annexed to and forming part of the specification.

BRIEF DESCRIPTION OF THE DRAWINGS

The novel features that are considered characteristic of the invention are set forth with particularity in the appended claims. The invention itself, however, both as to its structure and its operation together with the additional objects and advantages thereof will best be understood from the following description of the preferred embodiment of the invention when read in conjunction with the accompanying drawings wherein:

DETAILED DESCRIPTION OF THE INVENTION

Figure 1:
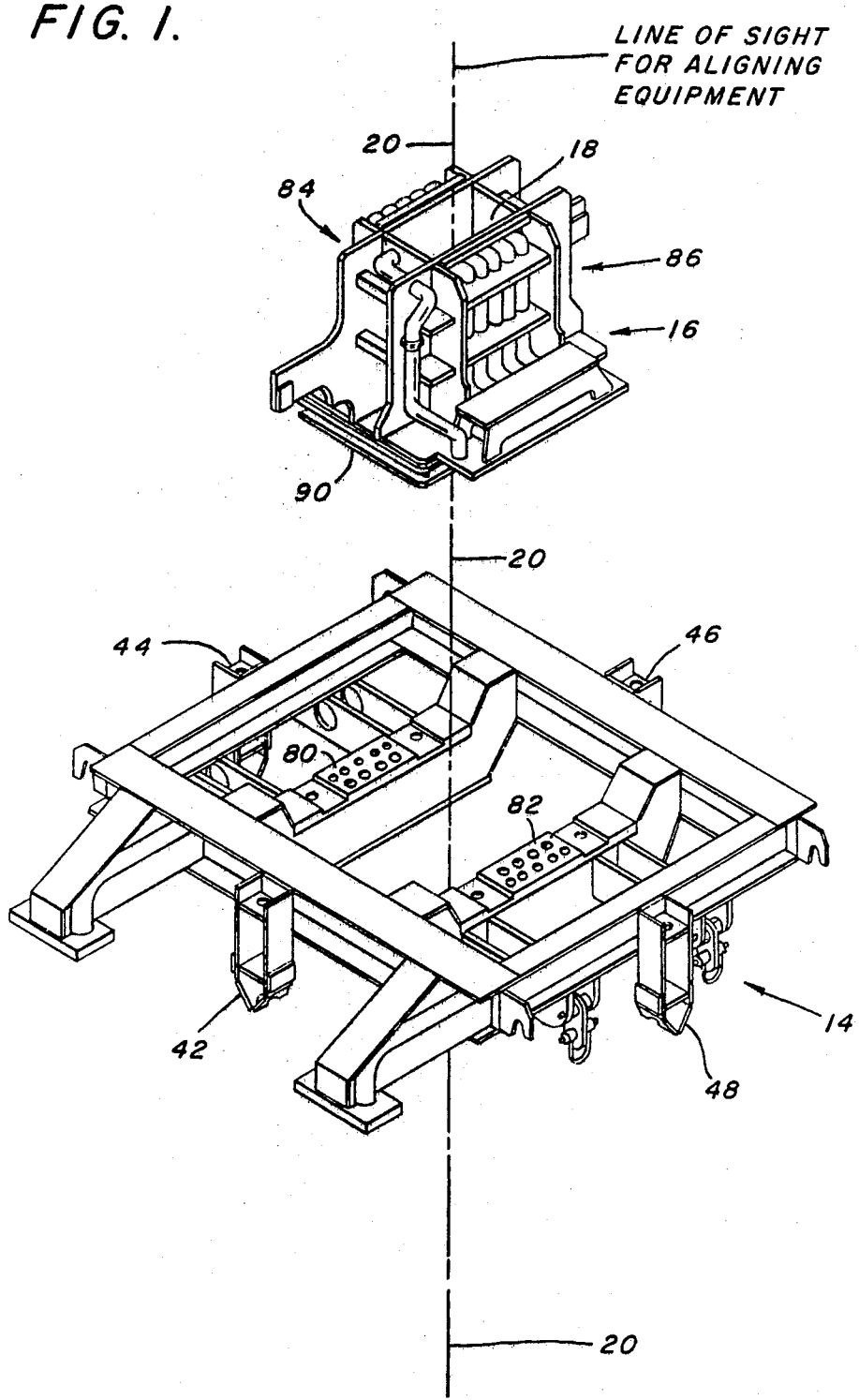
FIG. 1 is an isometric view of a portion of the continuous-casting machine which is to be aligned.
Figure 2:
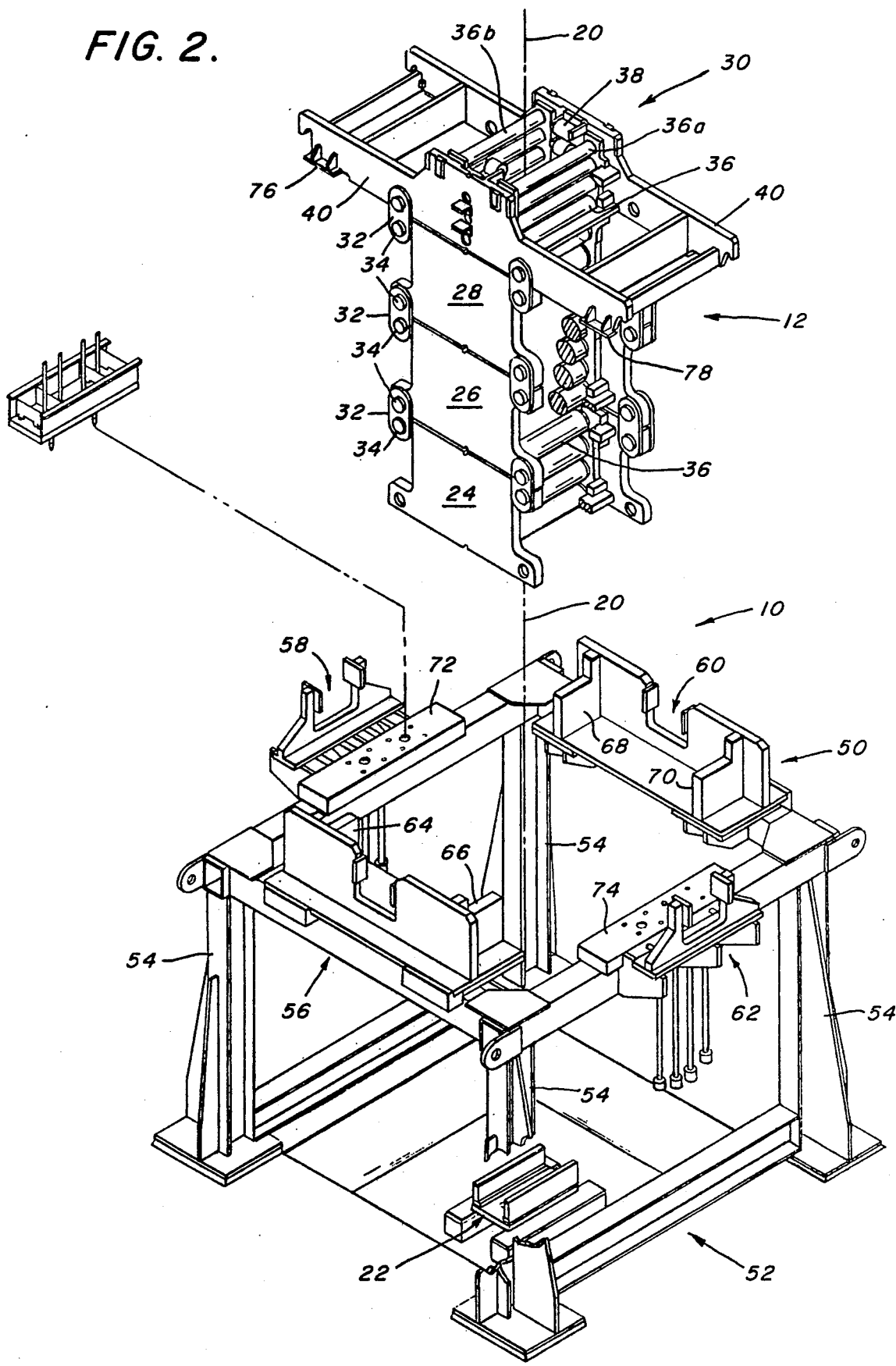
FIG. 2 is an isometric view of additional components of the continuous-casting machine and is a continuation of FIG. 1 showing a portion of the test and alignment apparatus according to the present invention.

Referring to FIGS. 1 and 2, the latter being a continuation of the former from below, there is shown a plurality of components of a continuous-casting machine and their relationship to one another and to a test and alignment stand shown generally at 10. The test and alignment stand 10 supports a plurality of casting machine components generally including a discharge rack 12, a mold oscillator table 14, a mold support 16 within which is inserted a mold 18. The combination of these various components of the continuous-casting machine represent from the mold 18 through the discharge rack 12 the initial components of the casting machine just prior to the bending rack (not shown) which begins to move the product from a vertical orientation to a horizontal orientation. A line 20 represents the center line of the product as it passes through each component of the continuous-casting machine from the mold to the discharge rack 12. In a preferred embodiment of the invention, it is this line from which all dimensions of each component is measured. Positioned at the bottom of the test and alignment stand 10 is a target assembly 22 having a target therein (not shown) which represents the continuation of the center line 20 into the curved rack portion (not shown) of the remainder of the continuous-casting machine. Target assembly 22 may take one of many configurations and will be described in further detail below.

The individual components of the continuous-casting machine which are aligned by the present apparatus should be well known to those skilled in the continuous-casting art. However, for purposes of elucidating the multi-step method of aligning each individual component, a more detailed presentation of these components should be undertaken.

The discharge rack 12 is generally composed of four sections: a lower rack section 24 which is located in overlying relationship to the curved rack portion of the remainder of the continuous-casting machine; a middle rack section 26; an upper rack section 28; and an uppermost rack section 30. The rack sections are retained together by a series of links 32 extending between each of the sections which, in combination with a plurality of pins 34, join each of the sections to those adjacent to it. Each of the rack sections 24, 26, 28 and 30 contain a plurality of width and edge rollers 36 and 38, respectively, as is well known in the art. The uppermost rack section 30 is configured having laterally spaced arms 40 which are employed for supporting the discharge rack 12 within the continuous-casting machine. The method and apparatus for aligning and gapping the rollers 36 and 38 within the discharge rack 12 are the subject of a copending application for United States Patent by Alfred J. Capriotti, Louis G. Lazzaretti and Brian O'Donnell entitled "Mold Discharge Rack Gapping Apparatus", Ser. No. 645,597 filed on Dec. 31, 1975, our Docket No. 1479, and assigned to the assignee of the present application. Accordingly, the specific method and apparatus for gapping the rollers contained within the discharge rack 12 will not be discussed here.

Located above the discharge rack 12 is the mold oscillator table 14 which not only provides support for the mold support 16 and mold 18, but oscillates the latter as is well known in the art. The mold oscillator table 14 is generally configured having a rectangular shape and includes a plurality of downwardly extending guide posts 42, 44, 46 and 48 located proximate the midpoint of each side of the generally rectangular-shaped mold oscillator table. The mold oscillator table 14 is supported within the continuous caster on a plurality of eccentric cams which will be shown and described below for providing the oscillating movement to the table and to the mold and mold support. The mold and mold support 18 and 16, respectively, are conventionally formed and contain all the necessary cooling elements and conduits for insuring their proper operation during the casting procedure.

The test and alignment stand 10 is located outside of the continuous-casting machine per se, and as suggested previously, is operative to support and provide alignment for the above-noted components of the continuous-casting machine. Additionally, the test and alignment stand provides a convenient way in which to store the aligned components prior to their insertion within the continuous-casting machine per se. The test and alignment stand 10 has a general table-like shape consisting of an upper support portion 50, a lower platform portion 52, and a plurality of legs 54 positioned therebetween. The upper support portion 50 of the stand 10 has an open central portion for permitting the insertion of the various components of the continuous caster therein in substantially overlying relationship with the target assembly 22 positioned proximate the lower platform portion of the test and alignment stand 10. Also provided about the periphery of the upper support portion 50 are a series of guide post brackets 56, 58, 60 and 62. As may be readily evidenced from FIG. 2, guide post brackets 56 and 60 are similar in design as are the pair of guide post brackets 58 and 62. The difference in the configuration of the first pair of guide brackets from the latter pair is due to the oscillator table supporting function of the first pair from the second. Specifically, a pair of step-like portions 64 and 66 associated with the guide post bracket 56 as well as step portions 68 and 70, associated with the guide post bracket 60 provide the support for the mold oscillator table through the cam followers associated with the mold oscillator table as will be explained in further detail below.

The guide post brackets 56, 58, 60 and 62 are arranged about the periphery of the upper support portion 50 of test and alignment stand 10 in such a manner as to receive and support the guide posts 42, 44, 46 and 48, respectively. Also provided about the periphery of the upper support portion 50 are two oppositely oriented pads 72 and 74 proximate the guide post brackets 58 and 62, respectively. The pads 72 and 74 provide a convenient locating device for the supporting portions 76 and 78 of the discharge rack 12 located in the lateral extension supports 40 of the uppermost rack section 30. It is in this manner that the discharge rack 12 is supported by the test and alignment stand 10. In a similar manner, two pads 80 and 82, located on supporting beams of the oscillator table 14 provide a convenient locating mechanism for the mold support 16 and its associated mold 18.

Figure 3:
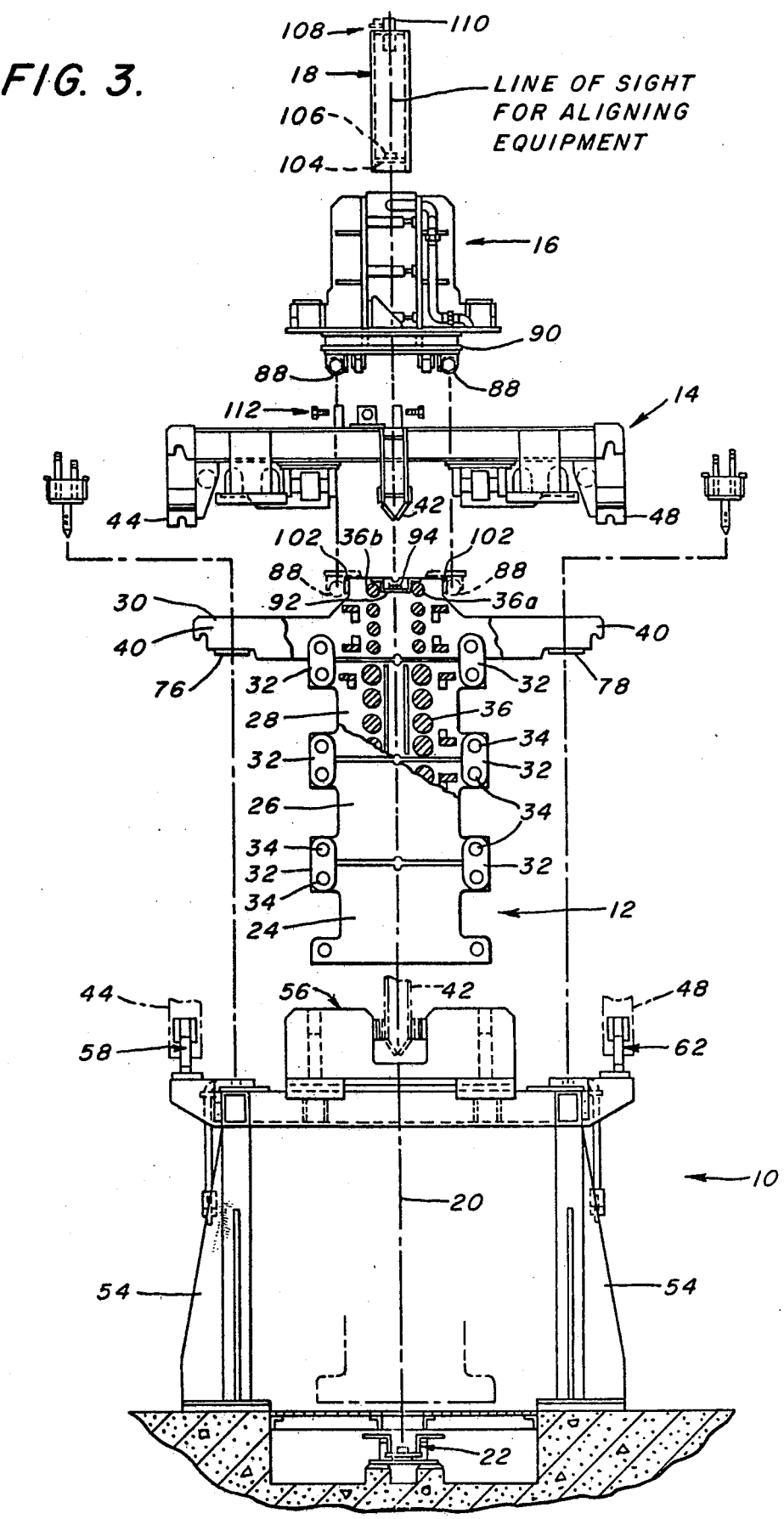
FIG. 3 is an exploded front elevational view of the apparatus as shown in FIGS. 1 and 2 combined.
Figure 4:
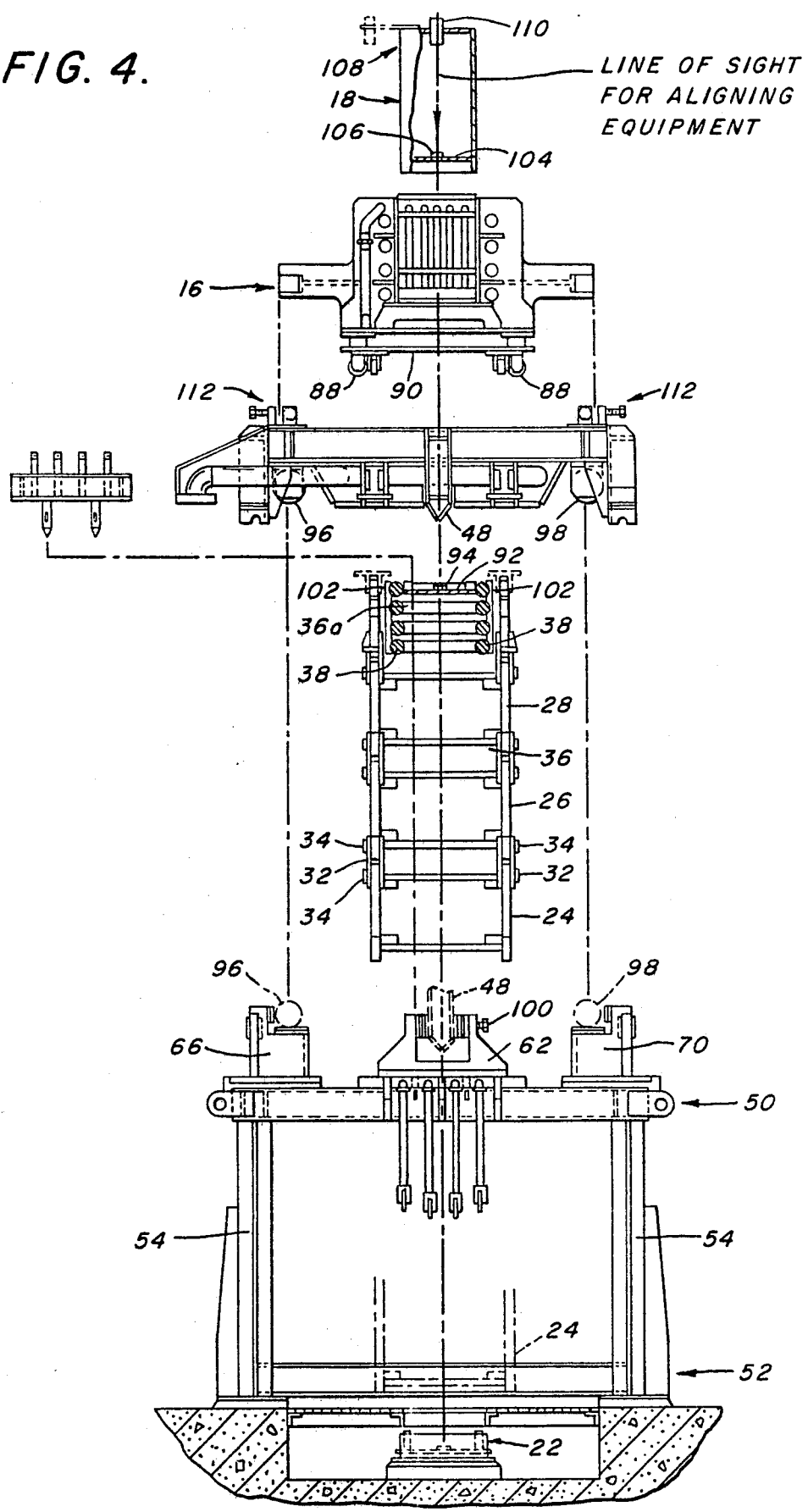
FIG. 4 is an exploded side elevational view of the apparatus as shown in FIGS. 1 and 2 combined.

Looking to FIGS. 3 and 4, there are shown exploded side and front views of the components of the continuous-casting machine as they are aligned by the test and alignment stand 10. Further, reference to FIG. 5 should be made in order to evidence the same components as they fit relative to one another and to the alignment stand 10.

The remaining structure and elements of the test and alignment stand 10, the discharge rack 12, the mold oscillator table 14 and the mold support 16 will be discussed as they relate to the method of aligning the various components of the continuous-casting machine both within the machine per se (in which case the test and alignment stand would not be used) as well as without the continuous-casting machine per se (in which case the test and alignment stand 10 would be used).

The first step in the procedure for aligning the components of the continuous-casting machine is that of spacing or gapping the rollers contained within each rack section 24, 26, 28 and 30 a given distance from the center line of the product 20 as the product passes through the discharge rack 12. This gapping or spacing is done to the width rollers 36 in each of the rack sections as well as the edge rollers 38 in each of the sections. As previously explained, the specific assembly for accomplishing this result is the subject of a co-pending United States patent application by Alfred J. Capriotti, Louis G. Lazzaretti and Brian O'Donnell. Consequently, for purposes of this application, it is assumed that the rollers 36 and 38 in all sections are correctly spaced from the product center line 20. Subsequent to proper spacing or gapping of the rollers 36 and 38, the four elements 24, 26, 28 and 30 of the discharge rack are connected together through the employment of the pins 34 and associated links 32 such that each element of the discharge rack hangs from the one above it. In this manner the elements of the discharge rack are provided with a given amount of movement due to the use of the links interconnecting them.

Subsequent to the gapping of the rollers incorporated within the discharge rack 12, the next step in the alignment procedure is the alignment of the mold support structure 16. The first step to be performed in the above-noted alignment procedure is the installation of the mold sub-assembly 18 into the mold support structure 16. The mold sub-assembly 18 is then bolted to the mold support structure and measurements are taken to assure that the bottom of the mold support 16 which rests upon the support pads 80 and 82 are in the same horizontal plane and that the mold 18 is perpendicular to the bottom of the mold support 16. This is accomplished by setting the mold structure down on a level table and setting the broad face of the mold perpendicular to the table using a fixed side 84 of the mold support structure as a reference. The opposite side of 86 of the mold support structure 16 is adjustable in a vertical plane.

The next stage in aligning the continuous caster elements is the coinciding or alignment of the mold support 16 to the discharge rack 12. This is accomplished through the use of a plurality of rollers 88 located at a bottom portion 90 of the mold support 16 (see FIG. 3). The rollers on opposite sides of the mold support bottom are spaced an equal distance from the center line of the mold support 16 and the mold 18 contained therein. Consequently, the placement of the mold support and its associated rollers over the uppermost portion 30 of the discharge rack 12 provides for the alignment of the center line of the mold support and mold to the center line of the discharge rack. The interrelationship of the rollers 88 of mold support 16 and the top of the uppermost rack section 30 is shown in FIG. 3 wherein the rollers are shown in phantom at the top of the uppermost discharge rack section 30.

Once the alignment of the mold relative to the mold support 16 and the discharge rack 12 is completed, the final assembly of the individual components of the continuous caster can be completed either on the test and alignment stand 10 or in the continuous-casting machine per se. The alignment procedure for the assembly within the test and alignment stand will now be given. It should be obvious that the procedure followed in this case should be almost identical to that of the installation of the individual component into the continuous-casting machine itself. It is also assumed for practical purposes that the test and alignment stand 10 is properly levelled and is centered over the target assembly 22 located at the bottom thereof. The target assembly 22, as previously noted, has a targeted marking thereon (not shown) which represents the center line of the remaining elements of the continuous caster, i.e., the bending rack unit and the horizontal runout rollers. Consequently, the position of the target fixture or assembly 22 simulates the position of the center line of the top pair of rollers in the bending unit (not shown). Next, the mold discharge rack is installed into the test and alignment stand 10. The components of the mold discharge rack 12 should be aligned prior to installation as described above. When installed, supporting portion 76 of the discharge rack rests upon the pad 72. In a similar manner, the supporting portion 78 of the discharge rack is supported on the pad 74 located opposite pad 72 on the test and alignment stand 10. The installation of the discharge rack 12 into the test and alignment stand 10 does not in and of itself align the center line 20 of the mold and discharge rack 12 with the center line of the remainder of the continuous-casting machine as simulated by the target assembly 22. Accordingly, the mold discharge rack 12 must be adjusted relative to the target assembly 22. This procedure will be described in further detail below.

A target fixture 92 (see FIG. 4) is positioned on the top rollers 36a and 36b at the uppermost rack section 30 as shown in FIG. 4. The target fixture 92 includes a target or cross hatch 94. The target fixture 92 is configured relative to the rollers 36a and 36b such that the cross hatch 94 is positioned at the center line 20 of the discharge rack 12. Next, the mold oscillator table 14 is positioned onto the test and alignment stand 10 in such a manner that the guide posts 42, 44, 46 and 48 of the test and alignment stand are captured within the respective guide post brackets 56, 58, 60 and 62 of the stand 10. When properly positioned upon the test and alignment stand 10, the mold oscillator table 14 is supported thereon through a plurality of cam followers, two of which are shown as at 96 and 98. These same two cam followers are shown in phantom in FIG. 4 just above step portions 66 and 70 of the alignment stand 10. Similarly, the guide post 48 is shown in phantom in FIG. 4 as it is captured by the guide post bracket 62. Proper alignment of the mold oscillator table 14 relative to the test and alignment stand 10 is achieved through a series of adjusting bolts 100 located on one portion of the guide post support brackets 56, 58, 60 and 62.

The next step in the alignment procedure is to mount the mold 18 with its associated mold support 16 onto the mold oscillator table 14 such that the mold guide rollers 88 ride over a series of wear plates 102 located at the top of the mold discharge rack. Next, a lower mold target 104 is mounted at the bottom of the mold 16. The mold target 104 has an associated cross hatch or sighting member 106 through which alignment is made. The mold target 104 is configured such that its placement within the mold 16 aligns the cross hatch 106 with the center line of the mold. Next, a telescopic fixture 108, having a vertical-optical transit 110, is installed at the top of mold 18. While a vertical-optical transit is employed in the preferred embodiment of this invention, it should be obvious that any optical sighting instrument such as a telescope or laser may be employed with equal efficiency.

Subsequent to the installation of the telescope fixture 108 including the vertical-optical transit 110, sighting is made through the cross hatch 106 of mold target 104, through the cross hatch 94 of the target fixture 92 associated with the discharge rack 12, and through the bending unit target fixture 22 located at the bottom of the test and alignment stand 10. This sighting is done to insure that all targets and their cross hatches are concentric. Should the targets not be concentric, adjustment to the mold support 16 should be made by means of the mold support adjustment bolts 112, two of which are positioned at each corner of the mold oscillator table as shown in FIG. 4. Movement of the mold support in one direction through use of the adjustment bolts 112 located on the mold oscillator table 14 moves not only the mold and mold support 18 and 16, respectively, but through the interrelationship of the rollers 88 positioned at the bottom of the mold support 16 moves the discharge rack 12 also. Consequently, the mold, the mold support and the discharge rack may all be moved together relative to the test and alignment stand 10 and to the target assembly 22 located at the bottom thereof.

Using the above-noted procedures, all of the concerned equipment has been aligned and checked with respect to the bending unit center line which is simulated by the target assembly 22 located at the bottom of the test and alignment stand 10. Bench marks are made on all of the pieces of equipment relative to the adjacent elements of the caster such that they may be once again aligned subsequent to the removal of the targets from each of the individual components. It should also be obvious that the above-noted procedure may be easily carried out on the continuous-casting machine per se as well as on the test and alignment stand as has just been described. Additionally, while the above-noted alignment procedure assumes that all targets are concentric with the center line 20 of the product as it passes through the elements of the continuous caster, such targets may be off the center line a given amount. However, the use of the center line of the product is a convenient and efficient way of aligning all the components and their associated targets.

Figure 5:
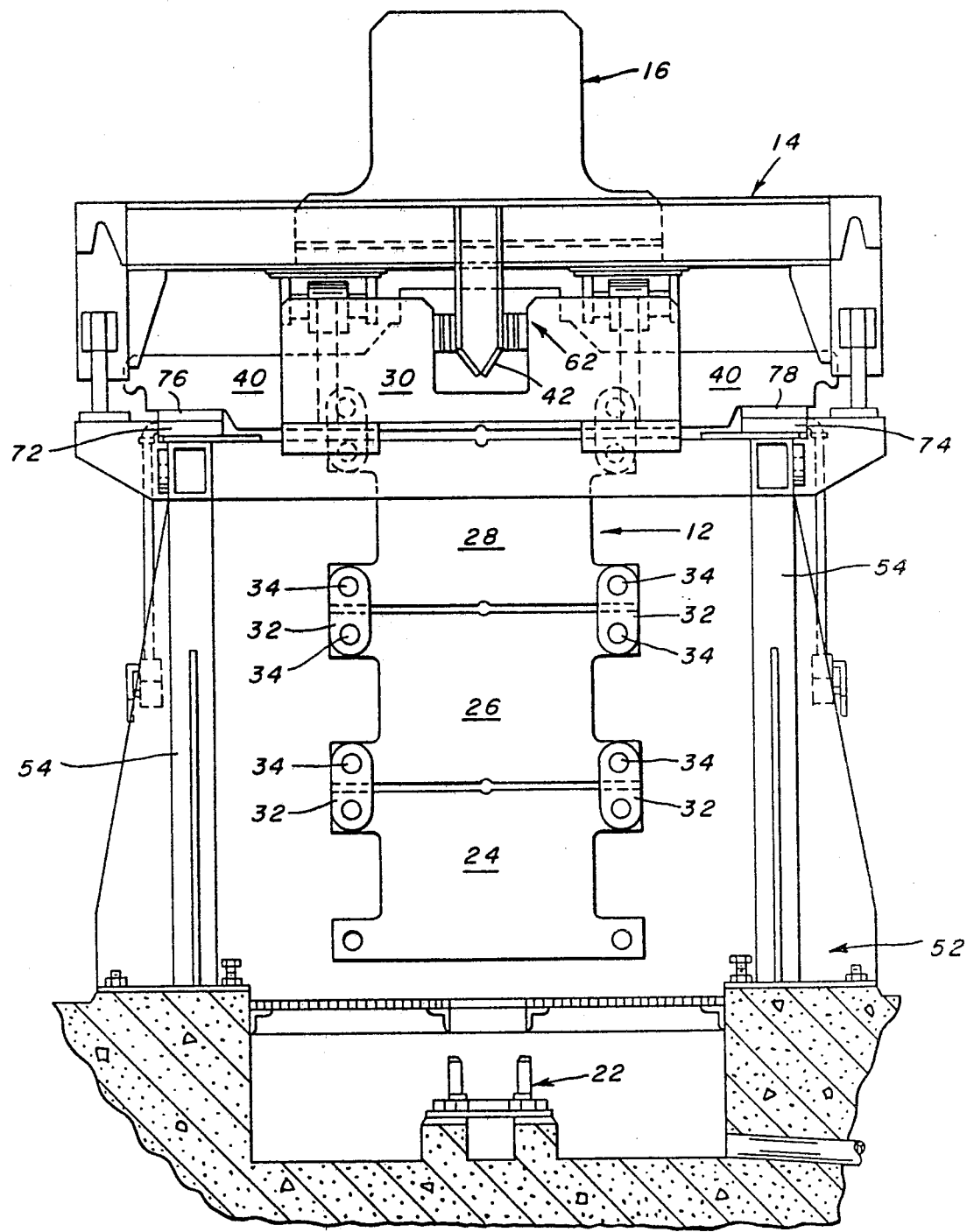
FIG. 5 is a front elevational view of the apparatus as shown in FIG. 3.

The assembled and aligned components of the continuous caster are shown in a pre-installment stage in FIG. 5 as they are supported by the test and alignment stand 10. As previously noted, the test and alignment stand 10 provides a convenient way in which these components may be stored prior to their insertion within the continuous-casting machine. Consequently, the damaged or worn portions or elements of the continuous caster may be easily substituted for by those components already in alignment on the test and alignment stand. This would obviously result in a much shorter downtime inasmuch as the caster components which must be substituted into the caster machine itself need only be lifted in by crane and placed in overlying relationship with the top of the bending unit once the old components have been removed. Setup times of two hours instead of ten hours are not uncommon using this procedure as opposed to old alignment procedures incorporating plumb-bobs and straight edges.

It should be apparent that the test and alignment stand and the alignment procedure presented above provide for several advantages over the old method of aligning the elements of a continuous caster. In particular, the use of the test and alignment stand as well as the optical targets and sighting equipment provide for a much more accurate manner of aligning the individual components of the machine. Moreover, the utilization of such method involves a much quicker and efficient manner of aligning the individual components. The addition of a test and alignment stand outside of the continuous-casting machine provides for the alignment of substitution elements outside of the machine in such a manner that they are ready to be placed into the machine when necessary. This procedure is effective in cutting down the caster downtime during alignment procedures previously employed.

While certain changes may be made in the above-noted system and apparatus without departing from the scope of the invention herein involved, it is intended that all matter contained in the above description or shown in the accompanying drawings shall be interpreted as illustrative and not in a limiting sense.

We claim:

1. A test and alignment stand for use in a continuous casting plant for prealigning and supporting a discharge rack, a mold oscillator table, a mold support and a mold prior to their placement within a continuous-casting machine for providing greater alignment accuracy and shortening caster downtime during alignment, said test and alignment stand comprising:

means for supporting such discharge rack in a level orientation, said supporting means including a target means including a sighting point having a predetermined dimensional relationship with a point representing the center line entrance point to the remainder of the continuous-casting machine, said supporting means being configured to support such discharge rack over said target means and to provide for the horizontal movement of such discharge rack relative to said target means;

means, located adjacent said discharge rack supporting means, for supporting such mold oscillator table, together with such mold and mold support supported thereupon, in overlying relationship to such discharge rack over said target means and for providing for movement of such mold oscillator table relative to said target means; and means for horizontally adjusting such mold oscillator table relative to said target means and to such discharge rack, the adjustment of such mold oscillator table relative to said target means also resulting in horizontal adjustment of such mold and such mold support which are supported upon such mold oscillator table.

2. A test and alignment stand for use in a continuous casting plant for prealigning and supporting a discharge rack, a mold oscillator table, a mold support and a mold prior to their placement within a continuous-casting machine for providing greater alignment accuracy and shortening caster downtime during alignment, said test and alignment stand comprising:

means for supporting such discharge rack in a level orientation, said supporting means including a target means including a sighting point representing the center line entrance point to the remainder of the continuous-casting machine, said supporting means being configured to support such discharge rack over said target means and to provide for the horizontal movement of such discharge rack relative to said target means;

means located adjacent said discharge rack supporting means, for supporting such mold oscillator table, together with such mold and mold support supported thereupon, in substantially operational association to such discharge rack and in overlying relationship to such discharge rack over said target means and for providing for movement of such mold oscillator table relative to said target means; and means for horizontally adjusting such mold oscillator table relative to said target means and to such discharge rack, the adjustment of such mold oscillator table relative to said target means also resulting in horizontal adjustment of such mold and such mold support which are supported upon such mold oscillator table.

3. The test and alignment stand of claim 2 in which said mold oscillator table supporting means is configured having means adapted to receive depending portions of such mold oscillator table in a manner that such table is positioned in substantially operational association with such discharge rack as both of such elements would exist in such continuous-casting machine.

4. The test and alignment stand of claim 3 in which said means for horizontally adjusting such mold oscillator table relative to said target means is positioned in proximate adjacency to such portions of such mold oscillator table and to said means for supporting such portions of such mold oscillator table, said means for horizontally adjusting such mold oscillator table being actuable for engaging such portions and exerting a force against such portions for adjusting such table relative to such target means.

5. The test and alignment stand of claim 2 in which said target means is located at a lower portion of said test and alignment stand.

6. The test and alignment stand of claim 2 in which said mold oscillator table supporting means is configured having means adapted to support depending portions of such mold oscillator table such that such table is positioned in substantially operational association with such discharge rack relative to the continuous-casting machine, said means for supporting such discharge rack in a level orientation over the target means being located inwardly of said table supporting means toward such center line and being configured to provide for the level supporting of such discharge rack while permitting relative movement between such discharge rack and such mold oscillator table.

* * * * *